(12) United States Patent
Brown et al.

(10) Patent No.: US 7,933,106 B2
(45) Date of Patent: Apr. 26, 2011

(54) SURGE PROTECTION DEVICE FOR COAXIAL CABLE WITH DIAGNOSTIC CAPABILITIES

(75) Inventors: Kenneth J. Brown, Chula Vista, CA (US); Yoshiharu Sueoka, Gardena, CA (US); Steve Grundt, Briarwood, NY (US); Carlos Ramirez, San Diego, CA (US)

(73) Assignee: Leviton Manufacturing Co., Inc., Melville, NY (US)

( * ) Notice: Subject to any disclaimer, the term of this patent is extended or adjusted under 35 U.S.C. 154(b) by 502 days.

(21) Appl. No.: 11/686,262

(22) Filed: Mar. 14, 2007
(Under 37 CFR 1.47)

(65) Prior Publication Data
US 2008/0062606 A1 Mar. 13, 2008

Related U.S. Application Data

(60) Provisional application No. 60/782,956, filed on Mar. 15, 2006.

(51) Int. Cl.
*H02H 9/04* (2006.01)
*H02H 1/04* (2006.01)
(52) U.S. Cl. .......................... 361/111; 361/56; 361/104
(58) Field of Classification Search ................. 361/111, 361/56, 104
See application file for complete search history.

(56) References Cited

U.S. PATENT DOCUMENTS

| 4,611,197 | A | * | 9/1986 | Sansky | 340/522 |
|---|---|---|---|---|---|
| 4,807,083 | A | * | 2/1989 | Austin | 361/111 |
| 4,903,161 | A | * | 2/1990 | Huber et al. | 361/56 |
| 5,053,910 | A | * | 10/1991 | Goldstein | 361/111 |
| 5,432,667 | A | * | 7/1995 | Rau et al. | 361/124 |
| 5,436,822 | A | * | 7/1995 | West, Jr. | 363/63 |
| 5,493,469 | A | | 2/1996 | Lace | |
| 5,698,846 | A | | 12/1997 | Funke | |
| 6,785,110 | B2 | * | 8/2004 | Bartel et al. | 361/119 |
| 7,116,007 | B2 | * | 10/2006 | Cern | 307/3 |
| 7,561,388 | B2 | * | 7/2009 | Sung et al. | 361/42 |
| 2009/0021881 | A1 | * | 1/2009 | Crevenat | 361/111 |

FOREIGN PATENT DOCUMENTS

| CA | 21320916 A1 | | 9/2007 |
|---|---|---|---|
| JP | 11051979 | * | 2/1999 |
| MX | 2008011330 A | | 9/2008 |

(Continued)

OTHER PUBLICATIONS

Notification of Transmittal of the International Search Report and Written Opinion of the International Searching Authority, or the Declaration dated Feb. 11, 2008 (PCT/US2007/064090).

(Continued)

*Primary Examiner* — Stephen W Jackson
*Assistant Examiner* — Zeev Kitov
(74) *Attorney, Agent, or Firm* — Kathryn J. Milam; Paul F. Rusyn; Graybeal Jackson LLP

(57) ABSTRACT

A surge protection circuit utilizing direct current (DC) voltage on the information carrying coaxial cable of a receiving device with a surge protection device to suppress transient signal fluctuations over the coaxial cable and a diagnostic surge protection status indicator with on/off configurations to indicate the status of operation of the surge protection device. The visual indicator may be a light emitting diode or some other indicator device that when energized indicates normal operation of the surge protection circuit.

18 Claims, 2 Drawing Sheets

FOREIGN PATENT DOCUMENTS

| | | | |
|---|---|---|---|
| WO | 2007106896 | A2 | 9/2007 |
| WO | 2007106896 | A3 | 9/2007 |

OTHER PUBLICATIONS

International Search Report, International Application No. PCT/US07/064090, Feb. 11, 2008, 1 page.

Written Opinion Dated Feb. 11, 2008, for International Patent Publication No, WO2007106896.

International Preliminary Report on Patentability Dated Sep. 16, 2008, for International Patent Publication No. WO2007106896.

* cited by examiner

SURGE PROTECTION DEVICE FOR COAXIAL CABLE WITH DIAGNOSTIC CAPABILITIES

PRIORITY claim

This application claims the benefit of priority pursuant to 35 U.S.C. §119(e) from U.S. Provisional Application No. 60/782,956 filed Mar. 15, 2006.

FIELD OF THE INVENTION

The present invention relates generally to surge protection devices and, more particularly, to a surge protection circuit with diagnostic status capability and method for use with coaxial cables.

BACKGROUND OF THE INVENTION

Surge protection circuits are known in the art to protect electronic equipment from voltage surges that impinge on wires transmitting power to the equipment. Devices known in the art such as televisions, computers, monitors and satellite-based receivers for satellite and cable television, however, receive information signals, such as audio signals, video signals, and other types of signals, that convey information, rather than power. Such information signals are typically conveyed using voltage, current or frequency modulation and, similar to wires transmitting power, are susceptible to voltage transient fluctuations, spikes, and/or surges that could damage sensitive electronic devices that receive the information signals.

Some devices receive information-based signals over dedicated information lines that do not transmit power. Such devices typically utilize standard construction coaxial cables for information-based signal transmission. Standard coaxial cables, designated RG6 or RG59, are constructed with a central conductor, an insulator that surrounds the central conductor, an outer conductor and an insulating outer sheath. For example, satellite television (Satellite TV) and cable television/community access television (CATV) systems typically use video signal processing devices, such as computers, set-top boxes, and video cassette recorders (VCRs), that use standard coaxial cables, coaxial cable connections, and coaxial cable jacks to connect to the Satellite TV or CATV system to receive information signals transmitted through the coaxial cables.

A need exists in the surge protection device art for a surge protection circuit to protect information signal line transmission, such as through coaxial cables, to provide surge protection for devices that receive the type of information signals transmitted in Satellite TV and CATV systems.

SUMMARY OF THE INVENTION

The present invention is a surge protection device and method of use that utilizes direct current (DC) to provide power to a surge protection status indicator to protect devices that receive information signals transmitted on coaxial cables from being damaged by transient signal fluctuations, spikes and/or surges that would otherwise damage such receiving devices.

The surge protection device is comprised generally of a surge protection circuit and diagnostic surge protection status indicator circuit and fuse connected in series (collectively referred to as the "parallel surge protection circuit"). The surge protection circuit is comprised of a surge protection device, such as a gas tube, one or more resistors, a ferrite bead and a fuse. The diagnostic surge protection status indicator circuit is comprised of an opto-isolator, resistors and a status indicator such as a light emitting diode (LED). The surge protection circuit and surge protection status indicator circuit are connected between the center conductor and the shield of the coaxial cable and in parallel to the coaxial cable.

The parallel surge protection circuit has a first terminal connected to the coaxial cable that carries an information signal and a second terminal connected to the shield ground. An information signal is input on the coaxial cable from, for instance, a Satellite TV transmission system. The information signal travels the length of the coaxial cable to the receiving device such as a VCR. During normal, undisrupted transmission of the information signal, the indicator device of the diagnostic status indicator circuit is activated with, for instance, the LED is illuminated, to indicate that DC power is being supplied to the parallel surge protection circuit and the surge protection is functional.

If the information signal experiences transient signal fluctuation, however, the surge protection device, such as a gas tube, detects the spike in voltage in the coaxial cable which then draws the potentially damaging current from the coaxial cable and diverts it to the shield ground. If the magnitude of the surge is large enough, the induced current will cause the fuse to open thereby creating an open circuit at the fuse between the surge protection device and ground. Once the parallel surge protection circuit is broken, the diagnostic indicator device, for instance a LED, is turned off indicating that the parallel surge protection circuit has suppressed a transitory spike or power surge in the coaxial cable and the fuse needs to be replaced to enable the circuit for a future transitory fluctuation in the information signal in the coaxial cable.

According to another aspect of the invention, a method is provided for suppressing surges along a non-AC transmitting conductor. The method of the present invention includes the steps of providing a surge protection circuit connected in parallel to a coaxial cable for information signal transmission wherein the diagnostic status indicator device is in the "on" configuration during normal, undisrupted information signal transmission. When the surge protection circuit detects a spike or surge in transmitted voltage, the surge protection device draws the potentially damaging power from the coaxial cable and diverts it to the shield ground which opens the circuit at the fuse and causes the diagnostic status indicator device to switch to the "off" configuration.

The parallel surge protection circuit herein disclosed is simple to implement, inexpensive to manufacture and modular in design for easy connection to coaxial cables for information signal transmission to existing video devices without having to replace or disassemble the coaxial cable connections or the receiving device. The parallel surge protection circuit is also compatible with connectors that are standard in the industry such as coaxial cable jacks and industry-accepted coaxial cables.

BRIEF DESCRIPTION OF THE DRAWINGS

For a better understanding of the invention, and to show how it may be carried into effect, reference is now made, purely by way of example, to the accompanying drawings in which like numerals designate corresponding elements or section thoughts and in which.

DETAILED DESCRIPTION OF PREFERRED EMBODIMENTS

The surge protection circuit disclosed utilizes a DC voltage on a coaxial cable to provide power to a surge protection status indicator that is in parallel with the coaxial cable to indicate the operational status of the surge protection circuit. The surge protection circuit is adapted to provide surge protection for video devices and/or other devices that receive information signals over coaxial cables. The surge protection circuit can divert signal surges such as transient signal fluctuations, spikes and/or surges, on coaxial cables to the shield ground which may prevent damage to the video devices coupled to receive signals on the coaxial cables.

Figure 1:
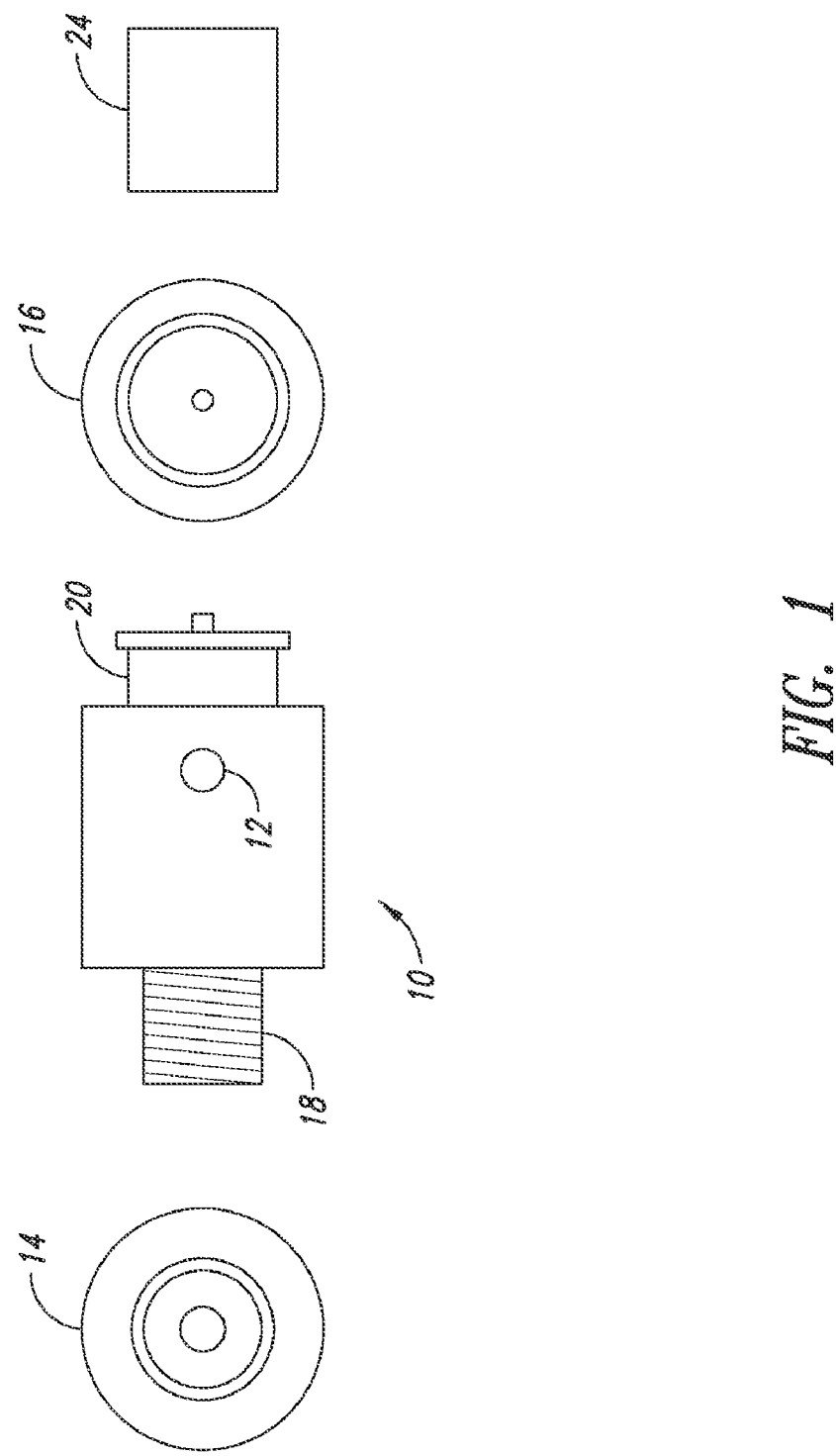
FIG. 1 depicts a block diagram of a surge protection device connected to a coaxial cable that includes the diagnostic status indicator device as a light emitting diode.

FIG. 1 depicts the surge protection device of the present invention which includes a cylindrical surge protection device 10 having input and output coaxial cables and diagnostic surge protection status indicator 12, in this case a LED, positioned thereon to indicate the status of operation of surge protection device 10. Accordingly, a user, by looking at the LED 12, can readily determine whether or not surge protection device 10 is working. LED 12 will be lit to indicate to a user that power is being provided to surge protection device 10 and surge protection is activated. Conversely, if LED 12 is not lit, a user is notified that no power is being provided to surge protection device 10.

In further reference to FIG. 1, coaxial cables 18, 20 are standard coaxial cables, such as RG6 or RG59 having, for example, an inner or central conductor, an insulator surrounding the central conductor, an outer conductor, and an insulating sheath. The information signals are typically transmitted through inner conductor of the coaxial cable, with the outer conductor typically being connected to a ground. In disclosed surge protection device 10, voltage signals from coaxial cable 18 carry information signals in a modulated format that is used to power surge protection device 10 even though coaxial cable 18 is operating to convey information, not power, signals to video device 24.

Figure 2:
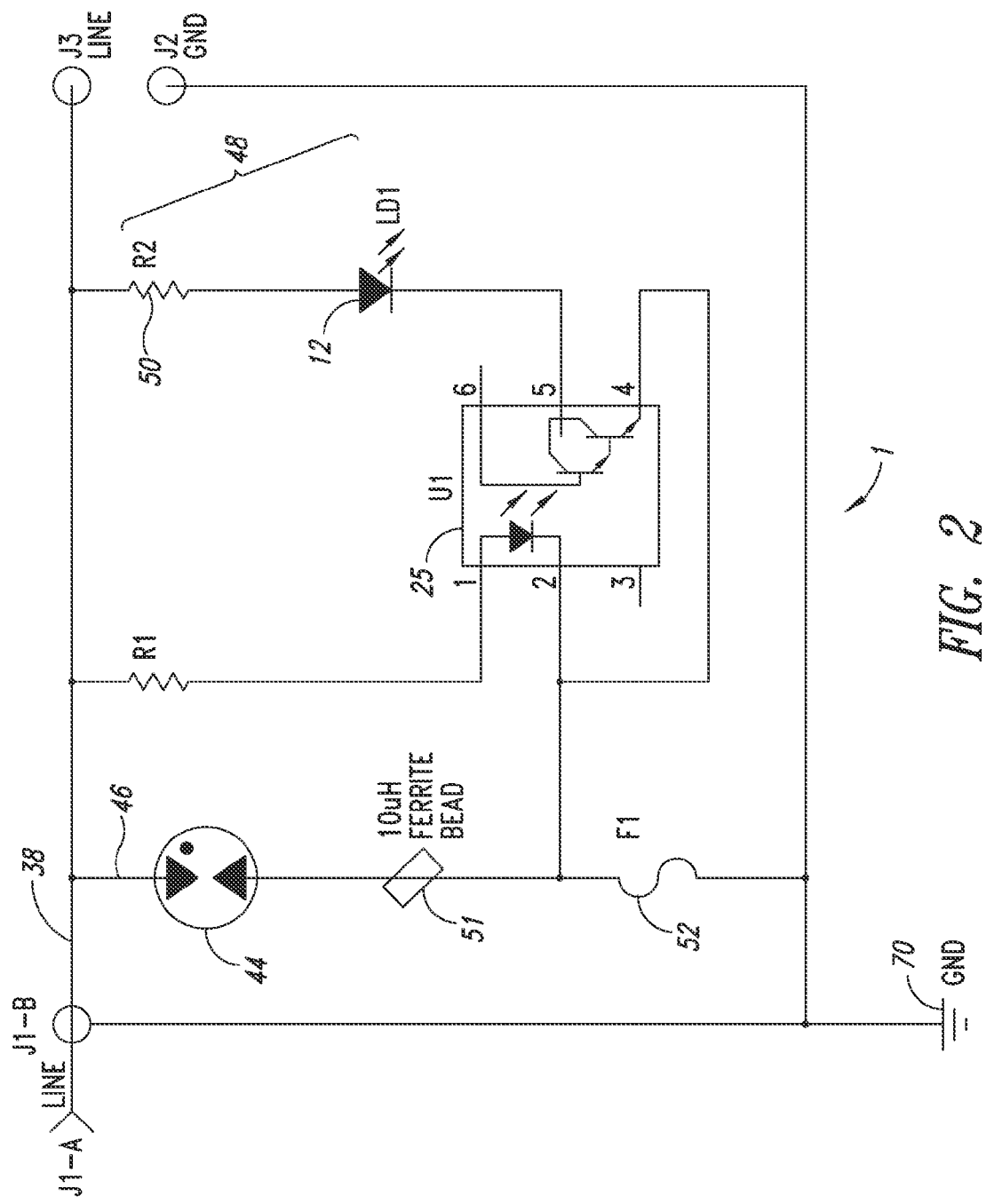
FIG. 2 depicts a schematic illustration of the parallel surge protection circuit comprised of the surge protection device circuit and in accordance with an embodiment of the invention.

FIG. 2 depicts a schematic illustration of a parallel surge protection circuit 1 that includes coaxial cable 18 on which the information signal is input through coaxial cable connector 14 to signal line 38 that conveys the information signal input on coaxial cable 18 to output coaxial cable 20 with cable connector 16 that transmits information signal to receiving device 24.

As further depicted in FIG. 2, the preferred embodiment of parallel surge protection circuit 1 is comprised first of the surge protection circuit that includes surge protection device 10, here depicted as a gas tube 44 which receives the information signal conveyed by signal line 38 transmitted by at least one tap line 46, one or more resistors, a high frequency suppression device such as ferrite bead 51, and a fuse 52 which leads to the shield ground 70. Parallel surge protection circuit 1 is further comprised of the diagnostic surge protection status indicator circuit 48 that includes resistor 50, diagnostic surge protection status indicator LED 12 and opto-isolator 25 to provide electronic isolation for LED 12 from coaxial cables 18, 20.

During normal, non-surge transmission of information signals on coaxial cables 18, 20, LED 12 is powered by DC current and lit indicating the parallel surge protection circuit is closed and ready to draw voltage from input coaxial cable 18 in response to transient signal fluctuations, spikes and/or surges. Upon transmission of such transient signal fluctuation into input coaxial cable 18, surge protection device 10 detects the signal fluctuation, draws the potentially damaging voltage from input coaxial cable 18 and diverts it to the shielded ground to protect information signal receiving device 24. Diversion of the potentially damaging voltage to the shielded ground breaks the circuit at fuse 52 and, thereafter, DC voltage to LED 12 is terminated and LED 12 stops glowing to indicate that parallel surge protection circuit 1 has suppressed a transient signal fluctuation, the circuit is open and fuse 52 needs to be replaced to close the circuit to be re-engaged to suppress future transient signal fluctuation in the system.

Device 24 (FIG. 1) receives information signals over coaxial cables 18, 20 where device 24 may be a computer, set-top boxes or VCR for processing. Operating power for device 24 is not provided by coaxial cables 18, 20.

In a further embodiment, surge protection device 10 may be a gas tube (as depicted in FIG. 2) or some other such protection device including a silicon avalanche diode (SAD). Parallel surge protection circuit 1 may also include a current limiting device connected in series with the diagnostic surge protection status indicator, such as LED 12 in FIG. 2, and/or a resistor in series with surge protection device 10, such as gas tube 12 in FIG. 2.

In another embodiment of the present invention, coaxial cable 18 receives information signals from a Satellite TV system, such as a digital satellite system (DSS)-based receiver connected to an antenna and/or a satellite dish, or cable television/community access television (CATV) as input information signals. In this embodiment, device 24 is a video signal processing device, such as a television or set-top box, that receives and processes the input information signals to generate corresponding TV images from selected channels.

FIG. 2 depicts a schematic in which the information signal input on coaxial cable 18 has a direct current (DC) voltage component, such as an offset voltage, and parallel surge protection circuit 1 uses this DC voltage as a power source for surge protection status indicator circuit and surge protection status indicator device such as LED 12 to indicate activated surge protection. For example, DSS satellite receivers may provide a DC signal of about 5 volts of DC (VDC) in addition to the information signal. In an alternative embodiment, the information signal may not include a DC voltage component. Instead, surge protection device 10 can include a rectifier to tap the information signal and generate DC voltage from the information signal. In a further alternative embodiment, parallel surge protection circuit 1 can include a separate power source or a connection to an external power source. Surge protection circuit 10 and/or indicator circuit 48 may require a minimum operating voltage of about 5 VDC that may also be supplied by a step up transformer or rectifiers that generate such a DC voltage.

Referring further to FIG. 2, gas tube 44 labeled GT1 has a 75 V rating and is connected by tap line 46 to signal line 38 to suppress surges in power signals transmitted along the coaxial signal line. Gas tube 44 can be any device, such as the PTX series of gas-tube surge protection devices commercially available from "NEXTEK, INC." of Westford, Mass. In alternative embodiments, a capacitor, a diode, or other surge protection device may be used instead of, or in addition to, gas tube 44 to perform surge protection.

Resistor 50 can have a value of 6.8 k ohms and may be used as a current limiter, and LED 12 in series with resistor 50, is connected in parallel with gas tube 44.

This parallel configuration may be connected in series with fuse 52 such as a TR250-145 fuse. In an alternative embodiment, a circuit breaker or other current limiting device may be used instead of fuse 52 to create an open circuit between gas tube 44 (in parallel with LED 12 and resistor 50) and ground 70.

The information signal, which includes or is otherwise the source of the DC voltage, is fed to surge protection circuit 10 which performs the desired surge protection.

In an alternative embodiment, the information signal may also be fed to indicator circuit 48 together with the DC voltage to cause LED 12 to light by a path to ground 70 which is provided through unbroken fuse 52. Glowing LED 12 indicates that surge protection device 10 is receiving power and surge protection operations are activated.

While the invention has been described in terms of specific embodiments, it is evident in view of the foregoing description that numerous alternatives, modifications and variations will be apparent to those skilled in the art. Accordingly, the invention is intended to encompass all such alternatives, modifications and variations which fall within the scope and spirit of the invention and the following claims.

The foregoing broadly outlines the preferred features of the present invention so that those skilled in the art may better understand the detailed description of the invention that follows. Additional features of the invention will be described hereinafter that form the subject of the claims of the invention. Those skilled in the art should appreciate that they can readily use the disclose conception and specific embodiment as a basis for designing or modifying other structures for carrying out the same purposes of the present invention and that such other structures do not depart from the spirit and scope of the invention in its broadest form.

We claim:

1. A surge protection circuit, comprising:
   first and second input nodes;
   first and second output nodes;
   a signal line connecting the first input node to the first output node, and
   the second input node being connected to the second output node, the signal line being adapted to carry an information signal;
   surge protection circuitry having a first node connected to the signal line, a second node connected to the second input node, and an intermediate node;
   a diagnostic surge protection status indicator device; and
   an optical isolation circuit having an input connected across the signal line and the intermediate node of the surge suppression circuitry and having an output that is connected in series with the diagnostic surge protection status indicator device, the output of the optical isolation circuit and the series-connected diagnostic surge protection status indicator device being connected across the signal line and the intermediate node.

2. The surge protection circuit of claim 1, wherein the surge protection circuitry comprises:
   a surge protection component having a first node connected to the first node of the surge protection circuitry and having a second node;
   a high frequency suppression device having a first node connected to the second node of the surge protection component and having a second node connected to the intermediate node of the surge protection circuitry; and
   a current limiting device having a first node connected to the intermediate node and a second node connected to the second node of the surge protection circuitry.

3. A surge protection circuit according to claim 2, wherein the surge protection component comprises one or a combination of a gas tube, a silicon avalanche diode, and a capacitor.

4. A surge protection circuit according to claim 2, wherein the current limiting device comprises a fuse.

5. A surge protection circuit according to claim 1, wherein the first input node and the second input node are configured for connection, respectively, to a central conductor and an outer conductor of a coaxial cable.

6. A surge protection circuit according to claim 1, further comprising a rectification circuit operable to rectify a portion of a signal on the signal line to generate a power signal for providing electrical power to the optical isolation circuit and diagnostic surge protection status indicator device.

7. A surge protection circuit according to claim 1, wherein the signal line is adapted to receive an information signal that is input from one of at least a satellite television transmitter system and cable television/community access television transmitter system.

8. A surge protection circuit according to claim 7, further comprising:
   a receiving device of said information signal, wherein the receiving device is one of at least a television and a set-top box and a video cassette recording device and a computer.

9. A surge protection circuit according to claim 1, wherein the signal line receives an information signal having a direct current voltage component to provide power to the optical isolation circuit and diagnostic surge protection status indicator device.

10. A surge protection circuit according to claim 1, further comprising one or a combination of a step up transformer and an external power source to provide power to the optical isolation circuit and diagnostic surge protection status indicator device.

11. A surge protection circuit according to claim 1, wherein the surge protection circuitry includes a high frequency suppression device comprising a ferrite bead.

12. A surge protection circuit for suppression of transient signals on first and second coaxial cables, each coaxial cable having an inner conductor and an outer conductor, the surge protection circuit comprising:
   an input port having a first input node adapted to be connected to the inner conductor of the first coaxial cable and a second input node adapted to be connected to the outer conductor of the first coaxial cable;
   an output port having a first output node connected to the first input node and adapted to be connected to the inner conductor of the second coaxial cable and a second output node connected to the second input node and adapted to be connected to the outer conductor of the second coaxial cable;
   surge suppression circuitry having a first surge node connected to the first input node, a second surge node connected to the second input node, and having an intermediate surge node, the surge suppression circuitry:
      operable in a first mode to couple the intermediate surge node to the second surge node and operable responsive to a transient signal being present on the first input node to allow a current to flow between the first surge node and the second surge node via the intermediate surge node, and
      operable in a second mode responsive to the current flowing between the intermediate surge node and second surge node exceeding a threshold value to isolate the intermediate surge node from the second surge node;
   a diagnostic surge protection status indicator circuit having a first status node connected to the first output node, a second status node connected to the intermediate surge node, a third status node connected to the first input node, and a fourth status node connected to the intermediate surge node, the diagnostic surge protection status indicator circuit operable to utilize a direct current and voltage present on the first input and output nodes to provide a first status of operation of the surge suppression circuitry during the first mode and to provide a second status of operation of the surge suppression circuitry during the second mode; and wherein the diagnostic surge protection status indicator circuit comprises, an opto-isolator circuit having a first opto input node connected to the first input node, a second opto input node connected to the intermediate surge node, a first opto output node, and a second opto output node connected to the intermediate surge node; and a diagnostic surge protection status indicator device connected to the first opto output node and the first output node.

13. The surge protection circuit of claim 12, wherein the surge suppression circuitry comprises:

a surge component having a first component node corresponding to the first surge node and having a second component node connected to the intermediate surge node, the surge component operably responsive to a voltage of the transient signal on the first input node exceeding a voltage threshold value to allow current to flow between the first and second component nodes and to isolate the first component node from the second component node otherwise; and a current limiting device having a first current node connected to the intermediate node and a second current node connected to the second input node, the current limiting device operable to connect the first current node to the second current node as long as the current flowing through the surge component and current limiting device is less than a current threshold value, and operable to isolate the first current node from the second current node responsive to the current through the surge component and current limiting device exceeding the current threshold value.

14. The surge protection circuit of claim 13, wherein the surge component comprises one of a gas tube, a silicon avalanche diode, and a capacitive element.

15. The surge protection circuit of claim 14, wherein the surge component further comprises a ferrite bead connected in series with the gas tube, diode circuit, or capacitive element.

16. The surge protection circuit of claim 13, wherein the current limiting device comprises a fuse.

17. A surge protection circuit according to claim 2, wherein the diagnostic surge protection status indicator device comprises one of a light emitting diode (LED), an audio device and a pulse/vibration device that when energized indicates normal operation of the surge protection circuit.

18. The surge protection circuit of claim 2, wherein the high frequency suppression device comprises a ferrite bead.

* * * * *